(12) United States Patent
Nakayama et al.

(10) Patent No.: US 12,242,092 B2
(45) Date of Patent: Mar. 4, 2025

(54) OPTICAL FILTER AND IMAGING DEVICE

(71) Applicant: AGC Inc., Tokyo (JP)

(72) Inventors: Motoshi Nakayama, Fukushima (JP); Kazuhiko Shiono, Fukushima (JP); Ryo Hirano, Tokyo (JP)

(73) Assignee: AGC Inc., Tokyo (JP)

( * ) Notice: Subject to any disclaimer, the term of this patent is extended or adjusted under 35 U.S.C. 154(b) by 489 days.

(21) Appl. No.: 17/804,007

(22) Filed: May 25, 2022

(65) Prior Publication Data

US 2022/0291433 A1    Sep. 15, 2022

Related U.S. Application Data

(63) Continuation of application No. PCT/JP2020/044361, filed on Nov. 27, 2020.

(30) Foreign Application Priority Data

Dec. 11, 2019 (JP) ................................ 2019-223748

(51) Int. Cl.
*G02F 1/1333* (2006.01)
*G02B 1/04* (2006.01)
*G02B 5/00* (2006.01)
*G02B 5/28* (2006.01)
(Continued)

(52) U.S. Cl.
CPC ............ *G02B 5/285* (2013.01); *G02B 1/04* (2013.01); *G02B 5/282* (2013.01); *G02B 1/14* (2015.01); *G02F 1/133345* (2013.01)

(58) Field of Classification Search
CPC ............ G02F 1/1333; G02F 1/133345; G02F 1/1335; G02F 3/00; G02B 1/04;
(Continued)

(56) References Cited

U.S. PATENT DOCUMENTS

2014/0350146 A1    11/2014   Tsubouchi
2016/0197112 A1    7/2016    Masuda
(Continued)

FOREIGN PATENT DOCUMENTS

| CN | 103874940 A | 6/2014 |
|---|---|---|
| JP | 2009-154489 A | 7/2009 |

(Continued)

OTHER PUBLICATIONS

International Search Report issued Dec. 28, 2020 in PCT/JP2020/044361, filed on Nov. 27, 2020, 2 pages.

*Primary Examiner* — Thoi V Duong
(74) *Attorney, Agent, or Firm* — Oblon, McClelland, Maier & Neustadt, L.L.P.

(57) ABSTRACT

The present invention relates to an optical filter including a resin base material including an infrared-absorbing pigment layer, and a pair of inorganic dielectric layers which are respectively disposed on or above both main surfaces of the resin base material as outermost layers, in which at least one of the pair of inorganic dielectric layers satisfies at least one of a condition in which a film thickness is 4 μm or greater, and a condition in which the number of layers is 30 or greater, and a ratio of a total film thickness of the pair of inorganic dielectric layers to a film thickness of the resin base material is greater than 8%.

10 Claims, 4 Drawing Sheets

1

(51) Int. Cl.
*G02F 1/1335* (2006.01)
*G02F 3/00* (2006.01)
*G02B 1/14* (2015.01)

(58) Field of Classification Search
CPC . G02B 1/113; G02B 1/14; G02B 5/00; G02B 5/223; G02B 5/26; G02B 5/282; G02B 5/285; C08K 5/0041; C08L 69/00
See application file for complete search history.

(56) References Cited

U.S. PATENT DOCUMENTS

| | | | |
|---|---|---|---|
| 2017/0017025 A1 | 1/2017 | Jidai et al. | |
| 2018/0095203 A1 | 4/2018 | Ooi et al. | |
| 2019/0176439 A1* | 6/2019 | Hara | B32B 17/10633 |
| 2020/0040161 A1* | 2/2020 | Kubo | C08K 5/5317 |

FOREIGN PATENT DOCUMENTS

| | | |
|---|---|---|
| JP | 2009-157273 A | 7/2009 |
| JP | 2010-44278 A | 2/2010 |
| JP | 2013-64975 A | 4/2013 |
| JP | 2017-32685 A | 2/2017 |
| JP | 2018-120096 A | 8/2018 |
| WO | WO 2013/038938 A1 | 3/2013 |
| WO | WO 2014/192714 A1 | 12/2014 |
| WO | WO 2015/046088 A1 | 4/2015 |
| WO | WO 2017/051867 A1 | 3/2017 |

* cited by examiner

OPTICAL FILTER AND IMAGING DEVICE

TECHNICAL FIELD

The present invention relates to an optical filter and an imaging device including the optical filter.

BACKGROUND ART

An imaging element such as CCD and CMOS is used in an imaging device such as a camera mounted on a portable phone such as a smartphone, on a computer, and the like. The imaging elements have characteristics of having a spectral sensitivity stronger with respect to light in a near-infrared region in comparison to a human luminosity characteristic. Accordingly, typically, an optical filter configured to correct a luminosity factor for matching a spectral sensitivity of a solid state imaging element to the human luminosity characteristic has been used.

As the optical filter, optical filters obtained by stacking a film having a desired optical characteristic on a surface of a base material formed of glass or a resin, have been conventionally used. Among these, the filter using glass as a base material is easily handled at the time of assembling the imaging element because the base material has high rigidity. In addition, in the filter using glass as a base material, flatness of the base material is higher in comparison to resin, and a spectral transmittance performance that is a function as a filter is high. Therefore, the filter including the glass base material is frequently used in high-performance cameras.

In an optical filter, an increase in size and a reduction in thickness are required along with a reduction in thickness of an optical device or an imaging device that uses the optical filter, or along with an increase in size of a sensor. On the other hand, a portable phone such as a smartphone, a computer, or the like is used while being carried, and thus durability against breakage due to dropping, or breakage due to deformation from the outside is required. The optical filter is also required to have durability against breakage such as cracks with respect to an external force, for example, impact or deformation when being dropped, deformation due to lens collision during autofocus, and the like.

Here, Patent Literature 1 suggests optical glass that suppresses a decrease in bending strength which is derived from an end surface due to a chip or a minute crack that exists in a ridgeline of glass as the origin and becomes a main factor of bending cracks, by using a cutting method with laser light as a method of cutting glass into an element.

Patent Literature 2 suggests an optical filter including a base material that includes a support having a specific elastic modulus and a resin layer formed on at least one surface of the support so that warpage or cracking is less likely to occur even when decreasing the thickness of the support.

On the other hand, in the case where the base material is a resin, cracks as in the optical filter including the glass base material hardly occur from an end surface of the base material, and thus this case is suitable for a reduction in thickness or an increase in size. However, in a configuration in which an inorganic dielectric multilayer film is formed on the resin base material, it is known that cracks are likely to occur in the dielectric multilayer film.

In contrast, Patent Literature 3 suggests a method of manufacturing an optical stacked film in which crack resistance is improved by forming a dielectric multilayer film on a base material film including a transparent resin having a high glass transition temperature at a temperature lower than the glass transition temperature of the transparent resin by 10° C. or more.

Patent Literature 1: International Publication No. 2015/046088
Patent Literature 2: JP-A-2017-032685
Patent Literature 3: JP-A-2010-44278

SUMMARY OF INVENTION

As described above, optical filters in which cracks are less likely to occur even when the base material is made thin have been examined and suggested from various viewpoints. These conventional suggestions are to suppress the occurrence of the origin of bending cracks in a base material end surface, or to change physical properties of the base material itself.

However, in the case of using an inorganic material such as glass as the base material, there remains a concern of bending crack breakage from an end surface. In addition, a further improvement in strength is required along with an increase in size and a reduction in thickness of optical filters.

On the other hand, even in the case of using a resin as the base material, since the elastic modulus of the resin is small in comparison to an inorganic material, deformation is likely to occur in an optical filter, and as a result, there is a concern of bending cracks of a dielectric multilayer film.

In contrast, an object of the present invention is to provide a high-rigidity optical filter in which warpage of a base material is less likely to occur and cracks are less likely to occur when a bending stress is applied, without using a special cutting method or a base material having changed physical properties even in the case of thinning the base material for a reduction in thickness, and an imaging device including the optical filter.

An optical filter according to an aspect of the present invention includes a resin base material including an infrared-absorbing pigment layer, and a pair of inorganic dielectric layers which are respectively disposed on or above both main surfaces of the resin base material as outermost layers. At least one of the pair of inorganic dielectric layers satisfies at least one of a condition in which a film thickness is 4 µm or greater, and a condition in which the number of layers is 30 or greater, and a ratio of a total film thickness of the pair of inorganic dielectric layers to a film thickness of the resin base material is greater than 8%.

In addition, in the optical filter of the aspect, in a stress-strain curve calculated by a four-point bending test, an inclination before a fracture mode occurs is preferably greater than 3.5 GPa.

In addition, an imaging device according to another aspect of the present invention includes the above-described optical filter.

In the optical filter according to the present invention, even in the case where the thickness of the resin base material is small, warpage is less likely to occur when forming the inorganic dielectric layer. Accordingly, desired optical characteristics as an optical filter can be obtained. Furthermore, since the film thickness of the inorganic dielectric layer in the optical filter can be increased, high rigidity is realized, and cracking is less likely to occur with respect to a bending stress.

The optical filter is also suitable for an imaging device such as a camera mounted on a device such as a smartphone and a personal computer, and thus a thin imaging device excellent in optical characteristics can be provided.

DESCRIPTION OF EMBODIMENTS

Figure 1:
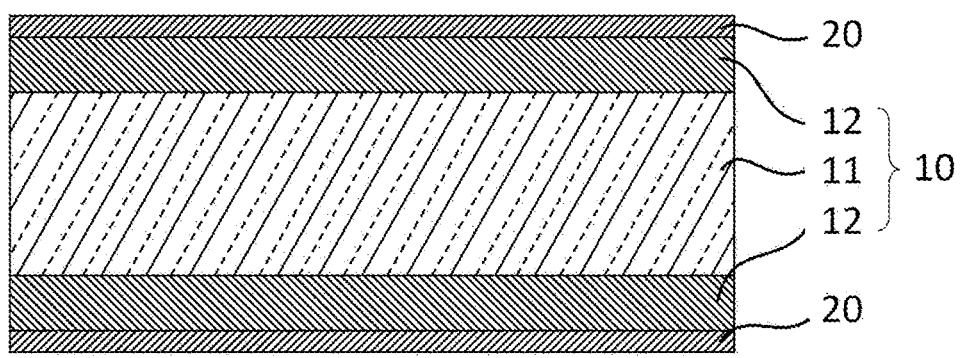
FIG. 1 is a schematic cross-sectional view illustrating an aspect of a configuration of an optical filter.

Hereinafter, the present invention will be described in detail, but the present invention is not limited to the following embodiments, and arbitrary modifications can be made in a range not departing from the gist of the invention. In addition, "to" indicating a numerical value range is used to include numerical values described before and after "to" as a lower limit value and an upper limit value, respectively.

[Optical Filter]

An optical filter 1 according an embodiment includes a resin base material 10 including an infrared-absorbing pigment (hereinafter, may be simply referred to as "IR pigment") layer 12, and a pair of inorganic dielectric layers 20 which are respectively disposed on or above both main surfaces of the resin base material 10 as outermost layers (refer to FIG. 1).

At least one of the pair of inorganic dielectric layers 20 satisfies a condition in which a film thickness is 4 µm or greater, a condition in which the number of layers is 30 or greater, or both the conditions. In addition, a ratio of the total film thickness of the pair of inorganic dielectric layers 20 to the film thickness of the resin base material 10 is greater than 8%.

(Inorganic Dielectric Layer)

The pair of inorganic dielectric layers are respectively disposed on or above both main surfaces of the resin base material as outermost layers.

A stress from the inorganic dielectric layer is applied to the resin base material. Accordingly, the larger the film thickness of the inorganic dielectric layer is, the further the stress applied to the resin base material increases, and the more warpage of the resin base material is likely to occur. This warpage is particularly significant in the case where the thickness of the resin base material is made small, and in this case, it is difficult to manufacture an optical filter that satisfies desired optical characteristics.

However, in the present invention, members or formation conditions at the time of forming the inorganic dielectric layer are ingeniously shaped. Accordingly, even in the case where a ratio of the film thickness of the inorganic dielectric layers to the film thickness of the resin base material is enlarged as a ratio of the total film thickness of the pair of inorganic dielectric layers to the film thickness of the resin base material being greater than 8%, occurrence of warpage can be suppressed in a satisfactory manner. That is, even in the case where the resin base material is made thin or the inorganic dielectric layer is made thick, deterioration of optical characteristics according to warpage of the resin base material can be prevented. As a result, at least one of the pair of inorganic dielectric layers can be set as a thick film in which a film thickness of 4 µm or greater or the number of layers is 30 or greater and thud, high rigidity of the optical filter is realized.

A preferable range of the film thickness of the inorganic dielectric layer is different depending on a function imparted to the inorganic dielectric layer, a material used, or the like. From the viewpoint of increasing rigidity of the optical filter, the film thickness of at least one of the inorganic dielectric layers is preferably 4 µm or greater, more preferably 5 µm or greater, and still more preferably 6 µm or greater. In addition, from the viewpoint of suppression of warpage or a variation in optical characteristics due to warpage, the film thickness is preferably 10 µm or less, and more preferably 8 µm or less.

From the same viewpoints, the number of layers of at least one of the inorganic dielectric layers is preferably 30 or greater, more preferably 40 or greater, and still more preferably 50 or greater. In addition, the number of layers is preferably 100 or less, and more preferably 80 or less.

In the case where at least one of the inorganic dielectric layers satisfies at least one of a condition in which the film thickness is 4 µm or greater and a condition in which the number of layers is 30 or greater, even when the film thickness of the resin base material is relatively small, high rigidity of the optical filter is realized. Note that, description of "the film thickness of the resin base material is relatively small" represents a case where the ratio of the total film thickness of the pair of inorganic dielectric layers to the film thickness of the resin base material is greater than 8%.

In addition, since the smaller a difference in the film thickness or in the number of layers between the pair of inorganic dielectric layers is, the less the warpage of the resin base material is likely to occur, which is preferable. Accordingly, both the pair of inorganic dielectric layers more preferably have a film thickness of 3.5 µm or greater.

In addition, the difference in the film thickness between the pair of inorganic dielectric layers is more preferably 3.5 µm or less, and still more preferably 3 µm or less.

The ratio of the total film thickness of the pair of inorganic dielectric layers to the film thickness of the resin base material is greater than 8%, and a specific film thickness depends on the thickness of the resin base material. For example, in the case where the thickness of the resin base material is approximately 0.03 to 0.1 mm, the total film thickness of the pair of inorganic dielectric layers is preferably approximately 5 to 20 µm.

The inorganic dielectric layer is a film obtained by stacking dielectric films, and is a film to which desired optical characteristics such as wavelength region selectivity, a transmittance, and a reflectance are imparted. Examples thereof include a reflection film that reflects a specific wavelength region, an antireflective film that prevents reflection of a specific wavelength region, a half mirror that distributes the quantity of light to reflection and transmission, a polarization film, and the like. More specific examples include an infrared reflective film (an infrared cut filter), an ultraviolet reflective film (an ultraviolet cut filter), a visible light antireflective film, a high reflection film, and the like.

The inorganic dielectric layer has a configuration in which dielectric films utilizing an optical interference of an optical thin film are stacked. The inorganic dielectric layer may obtain desired optical characteristics as a single layer film obtained by stacking one kind of dielectric film, or may obtain desired optical characteristics as a multilayer film obtained by repeatedly stacking two or more kinds of different dielectric films. For example, a reflective film or an antireflective film can be obtained by alternately stacking a dielectric film (low-reflective-index film) using a low-refractive-index material and a dielectric film (high-refractive-index film) using a high-refractive-index material. In addition, a dielectric film using an intermediate-refractive-index material is also preferably used as the antireflective film or the like.

Examples of a material of the dielectric film that constitutes the inorganic dielectric layer include $SiO_2$, $Na_5Al_3F_{14}$, $Na_3AlF_6$, $MgF_2$, $CaF_2$, $ZrO_2$, $Al_2O_3$, $LaF_3$, $CF_3$, $MgO$, $Y_2O_3$, $TiO_2$, $Ta_2O_5$, $Nb_2O_5$, $La_2O_3$, $ZnS$, $ZnSe$, $CeO_2$, $LaTiO_3$, $SiON$, $SiN$, $HfO_2$, and the like. Among these, at least one of the pair of inorganic dielectric layers preferably includes two or more kinds of dielectric films, and the dielectric film contains at least one compound selected from the group consisting of $SiO_2$, $ZrO_2$, $Al_2O_3$, $TiO_2$, $Ta_2O_5$, $La_2O_3$, and $Nb_2O_5$.

It is preferable to select a set of dielectric films having a certain refractive index difference or greater, from the viewpoint of optical characteristics imparted to the inorganic dielectric layers. Among the above-described materials, at least one of the pair of inorganic dielectric layers preferably includes, for example, a dielectric film containing $SiO_2$ and a dielectric film containing $TiO_2$, and at least one of the pair of inorganic dielectric layers is more preferably an inorganic dielectric layer obtained by alternately stacking a dielectric film containing $SiO_2$ and a dielectric film containing $TiO_2$.

With regard to the optical characteristics, at least one of the inorganic dielectric layers is preferably an infrared reflective film. The reason for this is that an imaging element has high spectral sensitivity with respect to infrared rays in comparison to human's eyes in the case where the optical filter is applied to a camera mounted on a smartphone or on a computer. That is, in the case where an infrared cutting performance is insufficient, a defect called flare or ghost occurs in a captured image. In recent years, an opportunity for emission of or irradiation with high-intensity infrared rays is increasing for face authentication or iris authentication, and thus a higher infrared-cutting performance is required for an infrared reflective film.

In the case where the infrared reflective film is obtained by stacking two kinds of dielectric films, when a refractive index of a dielectric film having a higher refractive index is set as $n_H$, and a refractive index of a dielectric film having a lower refractive index is set as $n_L$, the larger the value expressed by $(n_H-n_L)/(n_H+n_L)$, the higher the infrared reflectance obtained easily, which is preferable. Combining two or more kinds of dielectric films including a dielectric film containing $SiO_2$ and a dielectric film containing $TiO_2$ is also suitable for such a infrared reflective film.

From the viewpoint of increasing rigidity of the optical filter, a dielectric film containing $TiO_2$ is preferable. The reason for this is because of high Young's modulus of $TiO_2$.

In the case where at least one of the inorganic dielectric layers includes a dielectric film containing $SiO_2$ and a dielectric film containing $TiO_2$, a ratio of the total film thickness of the dielectric film containing $TiO_2$ to the total film thickness of the pair of inorganic dielectric layers is preferably 20% or greater, and more preferably 30% or greater. In addition, the upper limit is not particularly limited, but when considering to constitute an inorganic dielectric layer by stacking two or more kinds of dielectric films, the ratio of the total film thickness of the dielectric film containing $TiO_2$ is typically 50% or less.

The pair of inorganic dielectric layers disposed as outermost layers on or above both main surfaces of the resin base material is conventionally often set to the same configuration as or a similar configuration to each other. The reason for this is that warpage of a resin substrate is likely to occur at the time of forming the inorganic dielectric layers, and warpage is likely to be cancelled when the inorganic dielectric layers have the same configuration as or the similar configuration to each other.

However, in this embodiment, configurations of the pair of inorganic dielectric layers may be the same as or similar to, or may be completely different from each other. For example, films having different optical characteristics may be disposed in such a manner that one inorganic dielectric layer is set as an infrared reflective film, and the other inorganic dielectric layer is set as an antireflective film. In addition, even in the case where the optical characteristics are the same as each other, a material or a film thickness of the dielectric film that constitutes the inorganic dielectric layers, or the number of layers of the dielectric films stacked may be completely different from each other.

The pair of inorganic dielectric layers can be formed by stacking dielectric films on or above both main surfaces of the resin base materials, to be outermost layers. That is, in the case where the optical filter is constituted by only the pair of inorganic dielectric layers and the resin base material, the dielectric films are stacked on both the main surfaces of the resin base material. Alternatively, in the case where another layer is formed between the inorganic dielectric layer and the resin base material, the dielectric film is stacked on a surface of the other layer.

When stacking the dielectric films, for example, a vacuum film-forming process such as a CVD method, a sputtering method, and a vacuum vapor deposition method can be used.

In addition to high rigidity, desired optical characteristics can be obtained or warpage of the resin base material can be suppressed, by appropriately selecting the kind or the number of the dielectric films, a stacking order, the thickness of each layer, the total film thickness, or the like.

(Resin Base Material)

The resin base material 10 in this embodiment is not particularly limited as long as the resin base material 10 includes a transparent base material 11 formed of a resin and an IR pigment layer 12 (refer to FIG. 1).

The resin base material 10 may be a transparent base material with a high vertical incident average transmittance with respect to visible light in a wavelength region of 440 nm to 640 nm. For example, the average transmittance is preferably 80% or greater.

The IR pigment layer 12 shields infrared light by absorbing the light, and preferably shields light, particularly, in a near-infrared wavelength region. For example, it is preferable to absorb near-infrared light in a wavelength region of 720 nm to 1,150 nm, and in a spectral transmittance curve in a wavelength region of 400 nm to 1,150 nm, a maximum absorption wavelength is preferably in a wavelength region of 680 nm to 745 nm.

Note that, in this specification, the vertical incidence represents a value in the case where an incident angle of light is 0°, and represents a value to which no polarization characteristics are applied. The transmittance represents an internal transmittance, and represents a value expressed by an expression of "internal transmittance=transmittance/(100%−reflectance)". An average transmittance in a specific wavelength region is an arithmetic mean value of a transmittance for every one nm of the wavelength region.

A resin that constitutes the resin base material is not particularly limited, and conventionally known resins can be used. Examples thereof include resins such as cycloolefin polymers (COP) or cycloolefin copolymers (COC) such as a norbornene resin; polyimides (PI); polyamides; polycarbonates (PC); polyesters such as polyethylene terephthalate (PET) and polybutylene terephthalate; polyolefins such as polyethylene, polypropylene, and ethylene vinyl acetate copolymer; acryls such as polyacrylate and polymethylmethacrylate; epoxys; urethanes; polyvinyl chloride; fluororesins; polyvinyl butyral; and polyvinyl alcohol.

Among these, the resin in the resin base material preferably contains at least one kind selected from the group consisting of a cycloolefin polymer, a cycloolefin copolymer, a polyimide, a polycarbonate, and a polyester such as polyethylene terephthalate.

The resin may be contained as a main component of the transparent base material and may be contained as a resin that constitutes an IR pigment-containing resin layer that is an IR pigment layer, and both the cases are possible. Note that, the main component of the transparent base material represents a component that occupies the highest mass ratio among components which constitute the transparent base material, and the content of the main component in the transparent base material is preferably 50% by mass or greater.

In addition to the resin as the main component of the transparent base material, another resin or an arbitrary component such as an adhesion imparting agent, a leveling agent, an antistatic agent, a thermal stabilizer, an optical stabilizer, an antioxidant, a dispersant, a flame retardant, a lubricant, and a plasticizer may be contained in the transparent base material as necessary.

The transparent base material may be manufactured, or a commercially available resin film may be used. As a method of manufacturing the transparent base material, a known manufacturing method may be applied.

For example, the transparent base material can be manufactured by melting and extruding a mixture of a resin as the main component of the transparent base material and arbitrary components, to form into a film shape.

Alternatively, the transparent base material can also be manufactured as follows. Specifically, a coating liquid is prepared by dissolving or dispersing the resin as the main component of the transparent base material in a solvent or a dispersion medium in combination with arbitrary components as necessary, the coating liquid is coated on a peelable base material for manufacturing the transparent base material in a desired thickness, is dried, and is cured as necessary, and then the transparent base material is peeled off from the peelable base material. Note that, the coating liquid may contain a surfactant for improving voids due to minute bubbles, recession due to adhesion of foreign matters, repellency in a drying process, and the like.

When coating the coating liquid, for example, a dip coating method, a cast coating method, a die coating method, or spin coating method can be used.

The IR pigment layer is a layer in which an IR pigment is uniformly dissolved or dispersed in a resin. As the resin, for example, a resin that constitutes the above-described resin base material can be used.

The IR pigment is not particularly limited as long as the IR pigment is a pigment that absorbs infrared light. It is preferable to contain a pigment in which maximum absorption is in a wavelength region of 680 nm to 745 nm in a spectral transmittance curve in a wavelength region of 400 nm to 1,150 nm. In addition, since a near-infrared light is used in face authentication, iris authentication, or the like in an imaging device, the IR pigment layer also preferably contains a pigment that absorbs near-infrared light in a wavelength region of 720 nm to 1,150 nm.

As the IR pigment, a conventionally known pigment can be used. Specifically, examples thereof include a cyanine pigment with an extended polymethine skeleton, a phthalocyanine pigment containing aluminum or zinc at the center, a naphthalocyanine compound, a nickel dithiolene complex with a planar tetracoordinated structure, a squalium pigment, a quinone compound, a diimmonium compound, an azo compound, an imonium pigment, a diketopyrrolopyrrole pigment, a croconium pigment, and the like.

Among these, examples of the pigment compound in which maximum absorption is in a wavelength region of 680 nm to 745 nm include a squalium pigment, a cyanine pigment, a phthalocyanine pigment, and the like.

In addition, examples of the pigment compound in which maximum absorption is in a wavelength region of 720 nm to 1,150 nm include a squalium pigment, a cyanine pigment, a phthalocyanine pigment, a diketopyrrolopyrrole pigment, a croconium pigment, an imonium pigment, a diimmonium compound, and the like.

The IR pigment layer may further contain an absorbing agent other than the IR pigment. Examples thereof include arbitrary components such as a UV absorbing agent, an adhesion imparting agent, a color tone correction pigment, a leveling agent, an antistatic agent, a thermal stabilizer, an optical stabilizer, an antioxidant, a dispersant, a flame retardant, a lubricant, and a plasticizer.

The number or the position of the IR pigment layer 12 in the resin base material 10 are not particularly limited, and the IR pigment layer 12 is preferably provided in the whole region on at least one main surface of the transparent base material 11 formed of a resin. The IR pigment layer 12 is more preferably provided in the whole region on both main surfaces of the transparent base material 11 from the viewpoint of suppression of warpage. Note that, in the case where the IR pigment layer 12 is provided on both the main surfaces of the transparent base material 11, two layers of the IR pigment layers 12 may have the same configuration as or different configuration from each other. In addition, the IR pigment layer may be provided in two or more layers on the same main surface.

As a method of manufacturing the IR pigment layer, a known manufacturing method is applicable.

For example, the IR pigment layer formed in a film shape can be obtained by extruding a mixture including an IR pigment, a resin in which the IR pigment is dissolved or dispersed, and arbitrary components as necessary. The obtained film-shaped IR pigment layer is stacked on a main surface of the transparent base material, and the resultant is integrated by thermal compression or the like, thereby obtaining the resin base material.

Alternatively, the IR pigment layer can also be manufactured as follows. Specifically, a coating liquid is prepared by dissolving or dispersing the IR pigment, a resin in which the IR pigment is dissolved or dispersed, and arbitrary components as necessary in a solvent or a dispersion medium, and the coating liquid is coated on the main surface of the base material, is dried, and is cured as necessary. In the case where the base material is a transparent base material, the resin base material is obtained by the above-described process. In the case where the base material is a peelable base material, after peeling off the IR pigment layer from a peelable base material, the IR pigment layer is integrated to a main surface of the transparent base material by thermal compression or the like, thereby obtaining the resin base material.

Note that, the coating liquid may contain a surfactant for improving voids due to minute bubbles, recession due to adhesion of foreign matters, repellency in a drying process, and the like. When coating the coating liquid, for example, a dip coating method, a cast coating method, a die coating method, an inkjet coating method, a gravure coating method, a spin coating method, or the like can be used.

Figure 2:
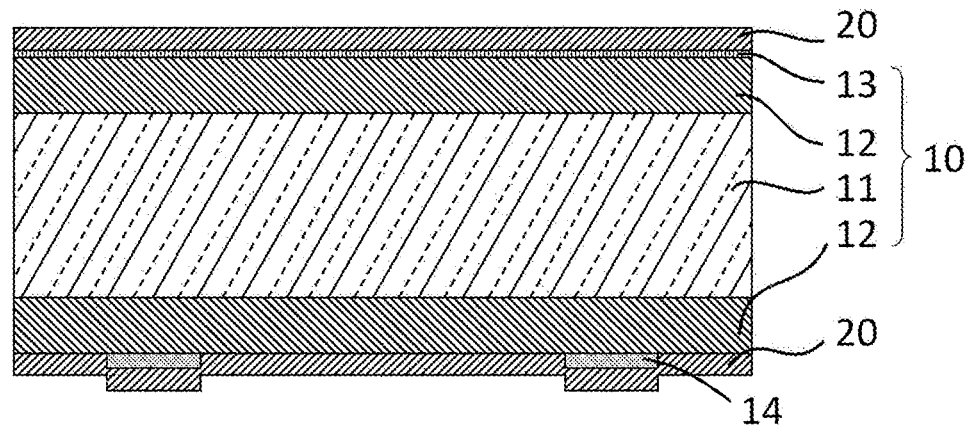
FIG. 2 is a schematic cross-sectional view illustrating an aspect of another configuration of the optical filter.

The resin base material 10 is preferably further provided with a hard coat layer 13 as an outermost layer of at least one main surface, and more preferably further provided with the hard coat layers 13 as outermost layers of both main surfaces (refer to FIG. 2). According to this, not only scratch resistance can be improved, but also adhesion between the inorganic dielectric layer 20 and the resin base material 10 can be enhanced. Note that, in the case where the hard coat layers 13 are provided as the outermost layers of both the main surfaces of the resin base material 10, configurations of the two hard coat layers 13 may be the same as or different from each other.

The hard coat layer 13 is not particularly limited as long as transparency of the resin base material 10 is not damaged, and a conventionally known hard coat layer can be used. For example, a layer formed of a resin having a glass transition temperature Tg of 170° C. or higher is preferable from the viewpoint that deformation due to heat or stress is less likely to occur, and the adhesion effect is excellent. The glass transition temperature is more preferably 200° C. or higher, and still more preferably 250° C. or higher. The upper limit of the glass transition temperature is not particularly limited, but the upper limit is preferably 400° C. or lower from the viewpoint of molding processability.

Examples of a resin that constitutes the hard coat layer include acrylic resins, a methacrylic resin, an epoxy resin, an ene-thiol resin, a polycarbonate resin, a polyether resin, a polyarylate resin, a polysulfone resin, a polyether sulfone resin, a polyparaphenylene resin, a polyarylene ether phosphine oxide resin, a polyimide resin, a polyimide imide resin, a polyolefin resin, a polycycloolefin resin, a polyester resin, and the like. Among these, an acrylic resin, a methacrylic resin, a polyimide resin, a polyester resin, and an epoxy resin are preferable from the viewpoint of imparting adhesion.

As a method of manufacturing the hard coat layer, a known manufacturing method is applicable.

For example, the hard coat layer formed in a film shape can be obtained by extruding a mixture of a resin that constitutes the hard coat layer, and arbitrary components as necessary. The obtained film-shaped hard coat layer is stacked on or above the transparent base material on which the IR pigment layer is disposed so that the hard coat layer becomes an outermost layer, and the resultant is integrated by thermal compression or the like, thereby obtaining the resin base material.

Alternatively, the hard coat layer can also be manufactured as follows. Specifically, a coating liquid is prepared by dissolving or dispersing a resin that constitutes the hard coat layer and arbitrary components as necessary in a solvent or a dispersion medium, and the coating liquid is coated on a main surface of the base material, is dried, and is cured as necessary. In the case where the base material is a transparent base material on which the IR pigment layer is disposed, the resin base material is obtained by the above-described process. In the case where the base material is a peelable base material, after peeling off the hard coat layer from the peelable base material, the hard coat layer is stacked on or above the transparent base material on which the IR pigment layer is disposed so that the hard coat layer becomes an outermost layer, and the resultant is integrated by thermal compression or the like, thereby obtaining the resin base material.

Note that, the coating liquid may contain a surfactant for improving voids due to minute bubbles, recession due to adhesion of foreign matters, repellency in a drying process, and the like. When coating the coating liquid, for example, a dip coating method, a cast coating method, a die coating method, an inkjet coating method, a gravure coating method, a spin coating method, or the like can be used.

The thickness of the resin base material 10 is a thickness satisfying that a ratio of the total film thickness of the pair of inorganic dielectric layers 20 to the film thickness of the resin base material 10 is greater than 8%. For example, the thickness of the resin base material 10 is preferably 0.03 mm to 1 mm, more preferably 0.5 mm or less from the viewpoint of a reduction in thickness, and still more preferably 0.2 mm or less. In addition, the thickness is more preferably 0.04 mm or greater from the viewpoint of easiness of handling at the time of forming the inorganic dielectric layer.

The thickness of the transparent base material 11 also depends on a configuration of the IR pigment layer 12 or the hard coat layer 13, but the thickness is preferably 0.025 μm or greater from the viewpoint of easiness of handling at the time of forming the inorganic dielectric layer, and more preferably 0.03 μm or greater. In addition, from the viewpoint of a reduction in thickness, the thickness of the transparent base material 11 is preferably 0.4 μm or less, and more preferably 0.15 μm or less.

The thickness of the IR pigment layer 12 is preferably 0.3 μm or greater from the viewpoint of the quantity of infrared light absorbed, and more preferably 0.5 μm or greater. In addition, from the viewpoint of suppressing a residual solvent after drying, the thickness of the IR pigment layer 12 is preferably 30 μm or less, and more preferably 20 μm or less. Note that, in the case where the JR pigment layers 12 are formed on both main surfaces of the transparent base material, the thickness of each IR pigment layer is preferably within the above-described range.

In the case where the hard coat layer 13 is provided, the thickness of the layer is preferably 0.3 μm or greater from the viewpoint of stability of a coated film thickness, and more preferably 0.5 μm or greater. In addition, from the viewpoint of suppressing a residual solvent after drying, the thickness of the hard coat layer 13 is preferably 30 μm or less, more preferably 20 μm or less, and still more preferably 10 μm or less. Note that, in the case where the hard coat layers 13 are formed on or above the outermost surfaces of both main surfaces of the transparent base material, the thickness of each hard coat layer is preferably within the above-described range.

(Other Layers)

In the optical filter 1 according to this embodiment, the inorganic dielectric layers 20 as disposed on or above both main surfaces of the resin base material 10 as outermost layers, and another layer may be provided between the resin base material 10 and the inorganic dielectric layer 20.

Examples of the other layer include a black matrix film that becomes a light-shielding layer 14 having a function of shielding stray light. The light-shielding layer 14 may cover the entire peripheral portion outside an optical valid region on a main surface of the resin base material, or may cover a partial region. A conventionally known material can be used for the light-shielding layer 14.

Examples of the other layer also include a constituent element (layer) imparting absorption by inorganic particulates that controle transmission and absorption of light in a specific wavelength region, or the like.

Specific examples of the inorganic particulates include indium tin oxides (ITO), antimony-doped tin oxides (ATO), cesium tungstate, lanthanum boride, and the like.

(Optical Filter)

An optical filter according to this embodiment is constituted by the resin base material, a pair of the inorganic dielectric layers, and other layers as necessary.

In the optical filter, even though a film thickness of at least one of the inorganic dielectric layers is 4 μm or greater and/or the number of layers of the dielectric film is 30 or greater, warpage does not occur, or even when warpage occurs, the degree of warpage is slight, and thus, adhesion is excellent. Warpage can be measured by a laser displacement meter, and a value measured by the measurement method is preferably 200 μm or less, and more preferably 100 μm or less.

In the optical filter, in a stress-strain curve calculated by a four-point bending test, an inclination before a fracture mode occurs is preferably greater than 3.5 GPa. The four-point bending test in this case is performed to evaluate bending strength of the optical filter differently from a purpose for evaluating material physical properties, and thus it is necessary to perform evaluation on the filter itself as a test specimen. In addition, since an optical filter to be mounted on a camera that is mounted on a portable phone such as a smartphone, on a computer, or the like is to be simulated, an interval between bending support points is preferably set to an interval based on actual usage. Specifically, it is preferable to apply a bending stress to be sandwiched by four points where a distance between load points is set to 1 mm and a distance between support points is set to 3 mm.

In accordance with a configuration of the optical filter, a value of the inclination is different depending on a measurement surface. Accordingly, when performing the four-point bending test on both surfaces of the optical filters, it is preferable that an inclination of at least one surface is greater than 3.5 GPa, it is more preferable that an average of the inclination is greater than 3.5 GPa, and it is still more preferable that inclinations in both surfaces are greater than 3.5 GPa.

Figure 3:
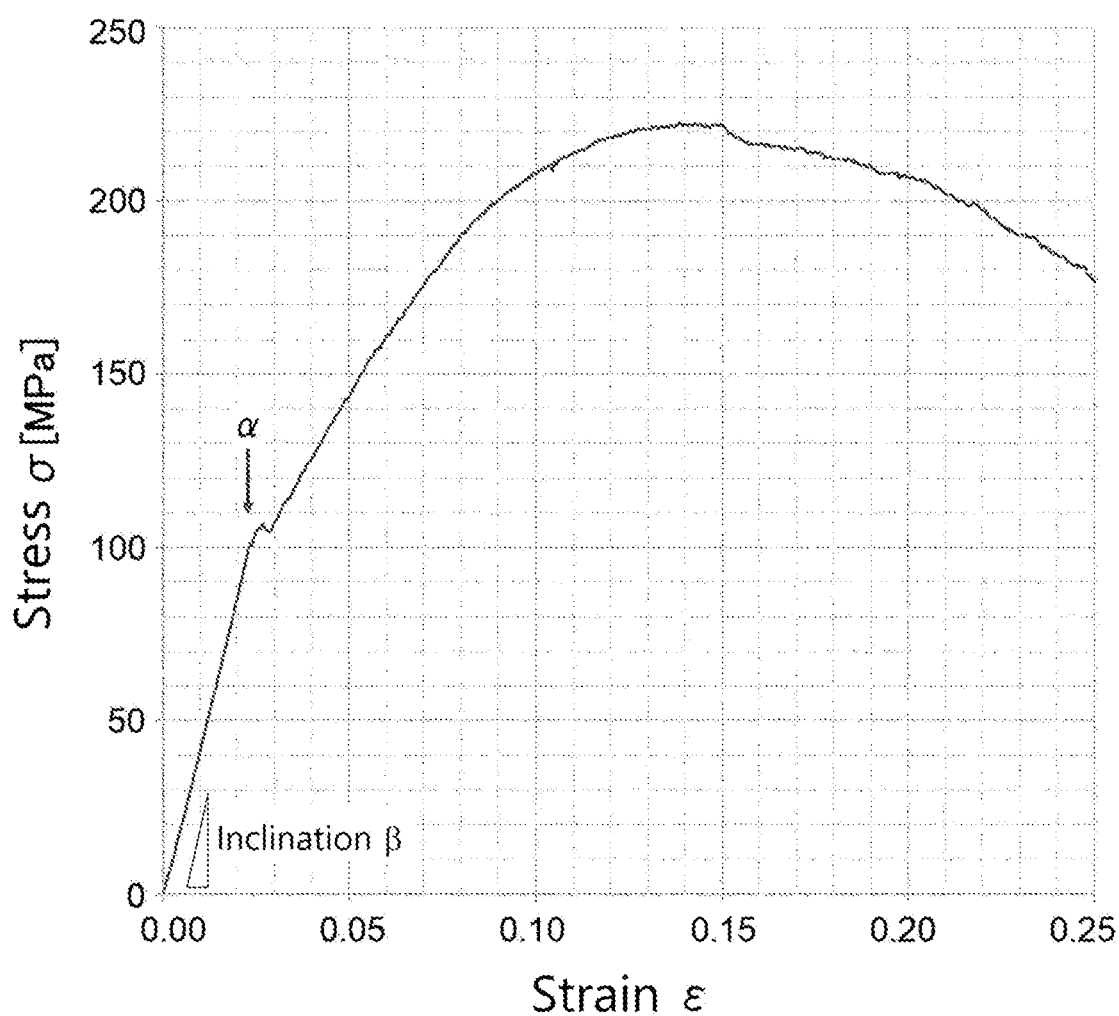
FIG. 3 is a graph showing an example of a stress-strain curve when performing a four-point bending test on the optical filter.

FIG. 3 shows an example of a stress-strain curve when performing the four-point bending test on an optical filter. Description of "before a fracture mode occurs in the stress-strain curve" represents an elastically changing region before a crack occurs on the basis of time when the crack indicated by a in FIG. 3 occurs. In addition, the inclination in the stress-strain curve calculated by the four-point bending test represents an inclination when a value of a stress σ (MPa) obtained by the test is taken on the vertical axis and a value of a strain ε (-) is taken on the horizontal axis, and is an inclination indicated by β in FIG. 3. That is, the inclination is a value corresponding to bending elastic force/Young' modulus. It can be said that when the inclination is gentle, bending is likely to occur, and when the inclination is large, that is, steep, it is strong against bending, fracture is less likely to occur, and rigidity is high.

Note that, the stress a and the strains in the four-point bending test are values calculated by the following expressions. A sample that is used in a sample width W and a sample thickness T in the expressions is the optical filter itself, and a shape is a quadrangular thin plate shape.

$$\sigma = (3P(L1-Lu))/(2WT^2)$$

$$\varepsilon = 12TD/((L1-Lu)(L1-2Lu)Z)$$

In the expressions, Lu represents a distance between load points, L1 represents a distance between support points, P represents a load, D represents a displacement, W represents a sample width, T represents a sample thickness, Z represent a cross-section coefficient, and I represents cross-section secondary moment.

The cross-section coefficient Z and the cross-section secondary moment I are values expressed by the following expressions, respectively.

Cross-section coefficient: $Z=(WT^2)/6$ (in the case of a plate shape, that is, a rectangular cross-sectional shape)

Cross-section secondary moment: $I=(W \times T^3)/12$ (in the case of a plate shape, that is, a rectangular cross-sectional shape)

With regard to the inclination, an inclination in at least one surface of the optical filter is preferably greater than 3.5 GPa, more preferably 4 GPa or greater, and still more preferably 5 GPa or greater.

An average of inclinations in both surfaces of the optical filter is preferably greater than 3.5 GPa, more preferably 4 GPa or greater, and still more preferably 5 GPa or greater. Inclinations in both surfaces of the optical filter is preferably greater than 3.5 GPa, more preferably 4 GPa or greater, and still more preferably 5 GPa or greater.

The upper limit of the inclination is not particularly limited, and is typically 40 GPa or less.

In addition to the inclination in the stress-strain curve, the optical filter is preferably excellent in optical characteristics such as high transmitting properties for visible light and high shielding properties for near-infrared light.

With regard to the optical characteristics, specifically, the optical filter preferably satisfies all of the following requirements (I-1) to (I-5).

(I-1) At an incident angle of 0°, an average transmittance $T_{435-480ave0}$ of light in a wavelength region of 435 nm to 480 nm is 86% or greater and an average transmittance $T_{500-600ave0}$ of light in a wavelength region of 500 nm to 600 is 89% or greater.

(I-2) At an incident angle of 30°, an average transmittance $T_{435-480ave30}$ of light in the wavelength region of 435 nm to 480 nm is 85% or greater, and an average transmittance $T_{500-600ave30}$ of light in the wavelength region of 500 nm to 600 nm is 89% or greater.

(I-3) An absolute value $\Delta T_{380-425ave0-30}$ of a difference between an average transmittance in a wavelength region of 380 nm to 425 nm at an incident angle of 0° and an average transmittance in the wavelength region of 380 nm to 425 nm at an incident angle of 30° is 3% or less.

(I-4) An absolute value $\Delta T_{615-725ave0-30}$ of an a difference between average transmittance in a wavelength region of 615 nm to 725 nm at an incident angle of 0° and an average transmittance in the wavelength region of 615 nm to 725 nm at the incident angle of 30° is 3% or less.

(I-5) In a transmittance of light at an incident angle of 0°, a wavelength at which a transmittance becomes 20% exists in a wavelength region of 650 nm to 685 nm.

In the case where the requirements (I-1) and (I-2) are satisfied, it can be said that the optical filter has high transmitting properties for visible light regardless of an incident angle.

In (I-1), $T_{435-480ave0}$ is more preferably 87% or greater, and $T_{500-600ave0}$ is more preferably 90% or greater and still more preferably 92% or greater.

In (I-2), $T_{435-480ave30}$ is more preferably 87% or greater, and $T_{500-600ave30}$ is more preferably 90% or greater and still more preferably 91% or greater.

In the case where the requirements (I-3) and (I-4) are satisfied, it can be said that even in any of a boundary between a visible region and a near-ultraviolet region and a boundary between a visible region and a near-infrared region, a variation between vertical incidence of light and oblique incidence of light is small.

In (I-3), $\Delta T_{380-425ave0-30}$ is more preferably 2.5% or less.
In (I-4), $\Delta T_{615-725ave0-30}$ is more preferably 2.5% or less.

In the case where the requirement (I-5) is satisfied, it can be said that the optical filter receives a large quantity of visible light and can effectively shield near-infrared light in a wavelength of 700 nm or greater. In the transmittance of light at an incident angle of 0°, the wavelength region where a wavelength of which a transmittance becomes 20% exists is more preferably 650 nm to 680 nm.

In addition, the optical filter preferably satisfies the following requirement (I-6) from the viewpoint of preventing crosstalk with light of a wavelength used in iris authentication or face authentication from occurring.

(I-6) A maximum transmittance of in a wavelength region of 800 nm to 1000 nm at an incident angle of 0° is 1% or less.

Here, the maximum transmittance is more preferably 0.5% or less, and still more preferably 0.1% or less.

The optical filter causes little warpage and has excellent adhesion and high rigidity even in the case of thinning the resin base material. Accordingly, the optical filter can be appropriately mounted on an optical device, an imaging device, or the like for which a reduction in thickness is required, and is also excellent in durability.

In addition, when the optical filter satisfies the above-described requirements relating to the optical characteristics, in the case where the optical filter is mounted on an imaging device, and even when being used in face authentication or iris authentication in combination, an image quality of a captured image is excellent.

[Imaging Device]

An imaging device according to this embodiment includes the optical filter described in [Optical Filter]. A preferred aspect of the optical filter provided in the imaging device is the same as the preferred aspect described in [Optical Filter].

A configuration of the imaging device other than the optical filter may be a conventionally known configuration, and for example, the imaging device includes a sold-state imaging element and an imaging lens. In this case, for example, the optical filter may be disposed between the imaging lens and the solid-state imaging element. In addition, the optical filter may be used in a state of being directly adhered to the solid-state imaging element or the imaging lens through a pressure-sensitive adhesive layer.

Since the optical filter has excellent optical characteristics and high rigidity, even in the case where the imaging device is a thin device, the optical filter can be appropriately mounted. In addition, since warpage does not occur in the resin base material, configurations of the pair of inorganic dielectric layers located as outermost layers of both main surfaces of the optical filter can be made different from each other. Accordingly, for example, an imaging device to which desired optical characteristics are imparted as in the case where one side is set as an infrared reflective film, and the other side is set as a reflective film can be provided.

EXAMPLES

Next, the present invention will be described in more detail with reference to Examples.

Example 1 to Example 8

An IR pigment layer A and an IR pigment layer B were formed on both main surfaces of a transparent base material described in Table 1. The IR pigment layer A and the IR pigment layer B were formed by mixing and dissolving pigment compounds (A) and (B) described below in a resin. The pigment compound (A) and the pigment compound (B) are compounds having a maximum absorption wavelength $\lambda_{max}$ of 707 nm and 399 nm, respectively.

In Example 1 to Example 5, a coating liquid was prepared by adding 0.70 parts by mass of the pigment compound (A) and 0.13 parts by mass of the pigment compound (B) to 100 parts by mass of polycarbonate resin and by using cyclopentanone as a solvent, and the coating liquid was applied and dried to form the IR pigment layer A and the IR pigment layer B.

In Example 6 to Example 8, a coating liquid was prepared by adding 9.62 parts by mass of the pigment compound (A) and 2.67 parts by mass of the pigment compound (B) to 100 parts by mass of polyimide resin and by using a mixed solution of cyclohexanone and γ-butyrolactone as a solvent, and the coating liquid was applied and dried to form the IR pigment layer A and the IR pigment layer B.

The film thicknesses of the transparent base material, the IR pigment layer A, and the IR pigment layer B are shown in Table 1. Note that, in Table 1, in the transparent base material, PI represents a polyimide resin (Neopulim (registered trademark) L-3450, manufactured by Mitsubishi Gas Chemical Company, Inc.), and PC represents a polycarbonate resin (PURE-ACE M5-80, manufactured by TEIJIN LIMITED). In addition, in Table 1, in IR pigment layer A and IR pigment layer B, PC represents a polycarbonate resin (FPC-220, manufactured by Mitsubishi Gas Chemical Company, Inc.), and PI represents a polyimide resin (Neopulim (registered trademark) C-3G30G, manufactured by Mitsubishi Gas Chemical Company, Inc.).

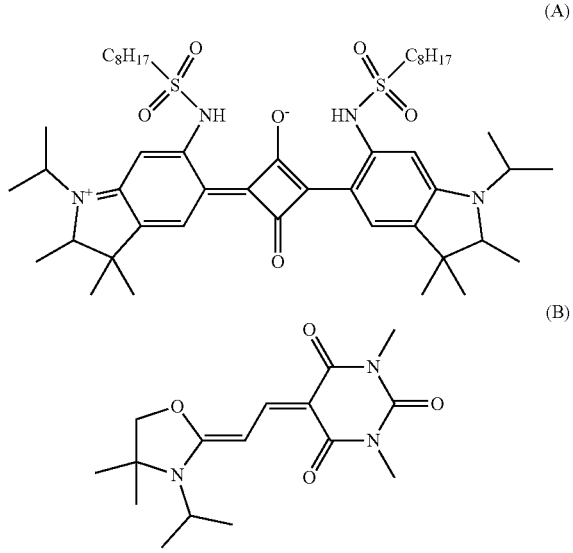

In Example 1 to Example 5, a hard coat layer A and a hard coat layer B were formed. In Example 1 to Example 4, a coating liquid prepared by diluting an acrylic resin in a dilution liquid was applied, dried, and UV-cured to form the hard coat layer A and the hard coat layer B. In Example 5, a coating liquid prepared by using a polyimide resin as a solvent and a mixed liquid of cyclohexanone and propylene glycol monomethyl ether was applied and dried to form the hard coat layer A and the hard coat layer B. Accordingly, the resin base material was obtained. The film thicknesses of the hard coat layer A and the hard coat layer B are shown in Table 1.

In Table 1, in hard coat layer A and hard coat layer B, acryl represents an acrylic resin (HO3320U-N60, manufactured by FUJIKURA KASEI CO., LTD.), and PI represents a polyimide resin (Neopulim (registered trademark) P500, manufactured by Mitsubishi Gas Chemical Company, Inc.). In addition, as the dilution liquid for the acrylic resin, HO2425C-5 (manufactured by FUJIKURA KASEI CO., LTD.) was used.

In addition, in Example 4 to Example 8, as a light-shielding layer for shielding stray light, a black matrix film is formed in a partial region on a surface of the IR pigment layer B or the hard coat layer B. Specifically, a light-shielding layer having a width of 0.4 mm to 0.7 mm was formed at four sides of an element inwardly from 0.1 mm inside positions from respective end surfaces of the element by screen printing.

In Table 1, BM represents the black matrix film, SI indicating a material represents a screen ink (GLS-HF20725 screen ink, manufactured by Teikoku Printing Inks Mfg. Co., Ltd.).

Dielectric films were stacked on surfaces of the resin base material or the black matrix film obtained as described above as an inorganic dielectric layer A and an inorganic dielectric layer B. As the dielectric film, two kinds including a $TiO_2$ film and a $SiO_2$ film were used, and these films were alternately stacked through vapor deposition. As a result, optical films of Example 1 to Example 8 were obtained.

Functions and film thicknesses of the inorganic dielectric layer A and the inorganic dielectric layer B are shown in Table 1, AR represents an antireflective film, and IR represents an infrared reflective film.

In Table 2, a total film thickness of a pair of inorganic dielectric layers including the inorganic dielectric layer A and the inorganic dielectric layer B, a total film thickness of the $TiO_2$ film that is a dielectric film, a total film thickness of the $SiO_2$ film that is a dielectric film, a ratio of each of the film thickness of the $TiO_2$ film and the $SiO_2$ film to a total film thickness of the $TiO_2$ film and the $SiO_2$ film, a film thickness of the resin base material, and a ratio of the total film thickness of the pair of inorganic dielectric layers to the film thickness of the resin base material are described in combination.

Finally, the optical film of Example 1 to Example 8 were made into elements having a size of 8 mm×6 mm by using blade dicing, thereby obtaining an optical filter. With respect to Example 4 to Example 8, the optical films were cut into elements at a position with an interval of 0.1 mm from an outer side of the light-shielding layer as described above.

Example 9

Cycloolefin copolymer resin ARTON (registered trademark) manufactured by JSR Corporation was used as a resin base material, and the inorganic dielectric layer A and the inorganic dielectric layer B were formed on both main surfaces of the resin base material in the same manner as in Example 1, thereby obtaining an optical filter. The resin base material includes a transparent base material of cycloolefin copolymer (COC), and the hard coat layer A and the hard coat layer B formed of an acrylic resin. In addition, the IR pigment layer A and the IR pigment layer B are also included, but details thereof were not analyzed, and are described as "N.D." in Table 1. In addition, details of the inorganic dielectric layer A and the inorganic dielectric layer B are shown in Table 2.

TABLE 1

| | Inorganic dielectric layer A | | | Hard coat layer A | | IR pigment layer A | | Transparent base material | |
|---|---|---|---|---|---|---|---|---|---|
| | Function | Film thickness (μm) | Number of layers | Film thickness (μm) | Material | Film thickness (μm) | Material | Film thickness (μm) | Material |
| Ex. 1 | IR | 6.67 | 59 | 1 | Acryl | 15 | PC | 50 | PI |
| Ex. 2 | IR | 6.67 | 59 | 1 | Acryl | 15 | PC | 50 | PI |
| Ex. 3 | AR | 3.75 | 7 | 1 | Acryl | 15 | PC | 50 | PI |
| Ex. 4 | IR | 6.67 | 59 | 1 | Acryl | 15 | PC | 50 | PI |
| Ex. 5 | IR | 6.67 | 59 | 5 | PI | 15 | PC | 50 | PI |
| Ex. 6 | IR | 6.67 | 59 | — | — | 1 | PI | 80 | PC |
| Ex. 7 | IR | 6.67 | 59 | — | — | 1 | PI | 50 | PI |
| Ex. 8 | IR | 3.74 | 29 | — | — | 1 | PI | 50 | PI |
| Ex. 9 | IR | 3.126 | 25 | 5.7 | Acryl | N.D. | N.D. | 95.6 | COC |

| | Resin base material | | | | | | | |
|---|---|---|---|---|---|---|---|---|
| | IR pigment layer B | | Hard coat layer B | | Other layers | | Inorganic dielectric layer B | |
| | Film thickness (μm) | Material | Film thickness (μm) | Material | Function | Material | Film thickness (μm) | Number of layers |
| Ex. 1 | 10 | PC | 1 | Acryl | — | — | AR | 3.75 | 7 |
| Ex. 2 | 15 | PC | 1 | Acryl | — | — | IR | 6.67 | 59 |

TABLE 1-continued

| | | | | | | | | | |
|---|---|---|---|---|---|---|---|---|---|
| Ex. 3 | 15 | PC | 1 | Acryl | — | — | AR | 3.75 | 7 |
| Ex. 4 | 10 | PC | 1 | Acryl | BM | SI | AR | 3.75 | 7 |
| Ex. 5 | 15 | PC | 5 | PI | BM | SI | AR | 3.75 | 7 |
| Ex. 6 | 1 | PI | — | — | BM | SI | AR | 3.75 | 7 |
| Ex. 7 | 1 | PI | — | — | BM | SI | AR | 3.75 | 7 |
| Ex. 8 | 1 | PI | — | — | BM | SI | IR | 3.79 | 41 |
| Ex. 9 | N.D. | N.D. | 5.7 | Acryl | — | — | AR | 2.776 | 27 |

TABLE 2

| | Film thickness of pair of inorganic dielectric layers (μm) | Film thickness of dielectric substance ($TiO_2$) (μm) | Film thickness of dielectric substance ($SiO_2$) (μm) | $TiO_2$ ratio | $SiO_2$ ratio | Film thickness of resin base material (μm) | Total film thickness of pair of inorganic dielectric layers/film thickness of resin base material |
|---|---|---|---|---|---|---|---|
| Ex. 1 | 10.42 | 2.55 | 7.87 | 24% | 76% | 77 | 14% |
| Ex. 2 | 13.34 | 4.94 | 8.40 | 37% | 63% | 82 | 16% |
| Ex. 3 | 7.50 | 0.16 | 7.34 | 2% | 98% | 82 | 9% |
| Ex. 4 | 10.42 | 2.55 | 7.87 | 24% | 76% | 77 | 14% |
| Ex. 5 | 10.42 | 2.55 | 7.87 | 24% | 76% | 90 | 12% |
| Ex. 6 | 10.42 | 2.55 | 7.87 | 24% | 76% | 82 | 13% |
| Ex. 7 | 10.42 | 2.55 | 7.87 | 24% | 76% | 52 | 20% |
| Ex. 8 | 7.53 | 2.98 | 4.55 | 40% | 60% | 52 | 14% |
| Ex. 9 | 5.90 | 2.31 | 3.59 | 39% | 61% | 107 | 6% |

| | Loading on inorganic dielectric layer A surface side | | | Loading on inorganic dielectric layer B surface side | | | Average of inclinations of both surfaces (GPa) | Stress maximum value (MPa) |
|---|---|---|---|---|---|---|---|---|
| | Inclination (GPa) | Strain | Stress (MPa) | Inclination (GPa) | Strain | Stress (MPa) | | |
| Ex. 1 | 4.61 | 0.0271 | 117 | 4.37 | 0.0368 | 140 | 4.49 | 140 |
| Ex. 2 | 7.12 | 0.0271 | 192 | 6.99 | 0.0280 | 196 | 7.06 | 196 |
| Ex. 3 | 3.18 | 0.0378 | 124 | 3.05 | 0.0317 | 116 | 3.12 | 124 |
| Ex. 4 | 4.52 | 0.0225 | 101 | 4.38 | 0.0313 | 134 | 4.45 | 134 |
| Ex. 5 | 4.49 | 0.0257 | 109 | 4.53 | 0.0320 | 142 | 4.51 | 142 |
| Ex. 6 | 3.83 | 0.0322 | 121 | 4.39 | 0.0244 | 103 | 4.11 | 121 |
| Ex. 7 | 5.64 | 0.0198 | 97 | 5.22 | 0.0284 | 140 | 5.43 | 140 |
| Ex. 8 | 7.51 | 0.0127 | 103 | 8.65 | 0.0218 | 180 | 8.08 | 180 |
| Ex. 9 | 2.57 | 0.0519 | 116 | 3.08 | 0.0353 | 97 | 2.83 | 116 |

(Evaluation: Four-Point Bending Test)

With respect to the obtained optical filters, a four-point bending test was performed by using a tensile compression tester (SVZ-200NB type, manufactured by IMADA SS CORPORATION). Under conditions in which a width of the optical filter as a sample was set to 6 mm, a distance between support points was set to 3 mm, a distance between load points was set to 1 mm, a pin dropping speed was set to 1 mm/minute, and a sampling speed was 0.1 seconds, a stress-strain curve in which the vertical axis represents a stress (MPa) and the horizontal axis represents a strain (−) like in FIG. 3 was obtained. In the curve, an inclination was obtained from an elastically changing region before a fracture mode due to occurrence of cracks occurred.

The test was performed on both surface of the optical filter, and an average of inclinations in both surfaces was obtained. Results are shown in "Average of inclinations of both surfaces" in Table 2.

In addition, values of a strain and a stress at a point where a crack occurred when being loaded from each surface are shown in Table 2.

Figure 4:
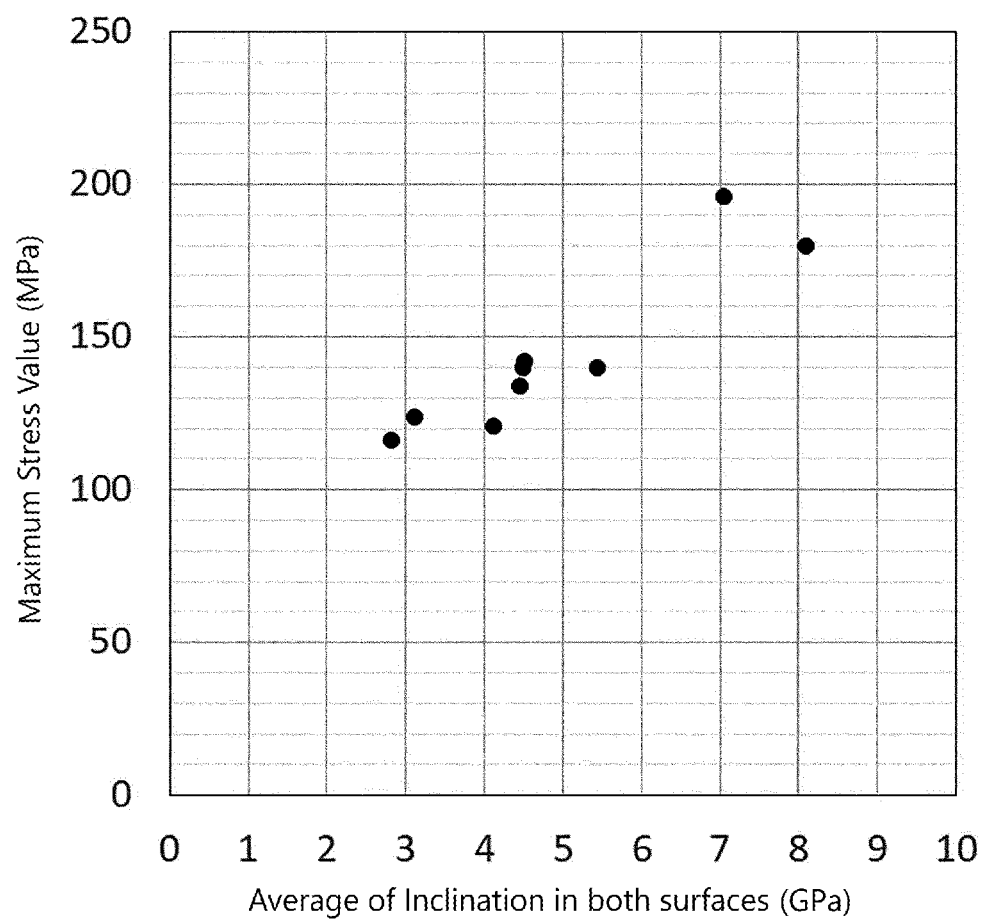
FIG. 4 is a graph showing a relationship between an average of an inclination in both surfaces and a maximum stress value when performing the four-point bending test with respect to optical filters of Example 1 to Example 9.

A maximum value of the stress at a point where a crack occurred among an A surface and a B surface is shown as "stress maximum value" in Table 2. A relationship between the stress maximum value and the average of inclinations of both surfaces in Example 1 to Example 9 is shown by a graph in FIG. 4, and it can be seen that a strong positive correlation exists therebetween. That is, when the inclination increases, bending crack resistance is improved.

Note that, when performing the four-point bending test on a resin base material itself in Example 1 to Example 8, an inclination in the stress-strain curve was approximately 1 GPa. This measurement result is a value smaller than a bending elastic constant of the material itself. With regard to a bending elastic modulus as a material physical property, as described in "Plastics-Determination of flexural properties" in JIS K7171:2016, a test is typically performed with a thick test specimen having a thickness of approximately 4 mm as a recommended test specimen. However, in the above-described test, it is considered that since the thickness of the resin base material as a test specimen was small, the bending elastic modulus of the material itself, that is, the material physical property value, could not be accurately measured, and instead a value of the base material corresponding to thinness of the test specimen was measured.

Accordingly, since the test results shown in Table 2 are results of strength measurement on an optical filter manufactured by using the thin resin base material, there is no problem, and the test results reveal that rigidity became higher by forming the inorganic dielectric layer on the resin base material.

(Evaluation: Optical Characteristics)

Figure 5:
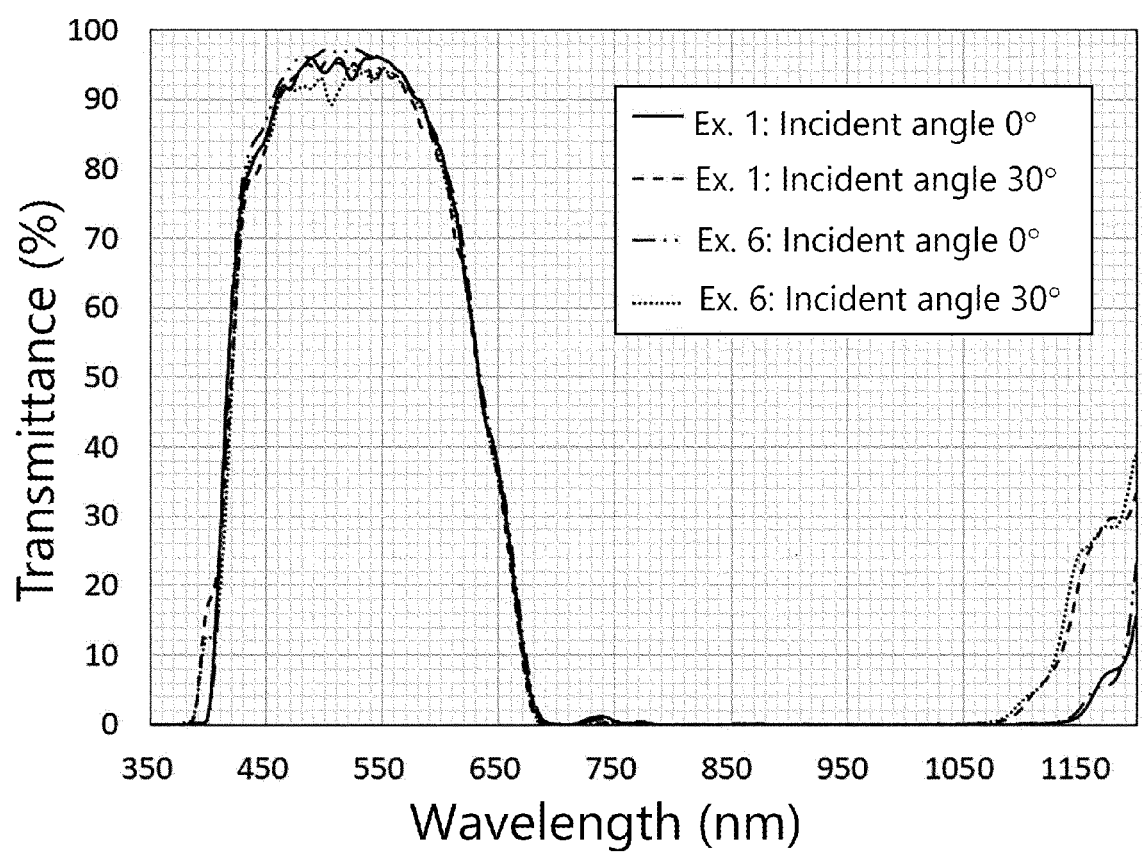
FIG. 5 is a transmittance spectrum at an incident angle of 0° and 30° in Example 1 and Example 6.

With respect to optical filters of Example 1 and Example 6, among the obtained optical filters, transmittance measurement was performed in a wavelength region of 350 nm to 1,200 nm by using an ultraviolet-visible spectrophotometer (U-4100 type, manufactured by Hitachi High-Tech Corporation). Measurement was performed with respect to the vertical incidence case where an incident angle of light was 0°, and the case where the incident angle was 30°. Results are shown in Table 3 and FIG. 5.

TABLE 3

|  | Example 1: incident angle of 0° | Example 1: incident angle of 30° | Example 6: incident angle of 0° | Example 6: incident angle of 30° |
|---|---|---|---|---|
| Average transmittance of wavelength of 435 to 480 nm (%) | 87.9 | 87.1 | 90.3 | 87.2 |
| Average transmittance of wavelength of 500 to 600 nm (%) | 92.8 | 91.6 | 93.7 | 91.1 |
| Average transmittance of wavelength of 380 to 425 nm (%) | 20.8 | 23.2 | 20.3 | 20.1 |
| Average transmittance of wavelength of 615 to 725 nm (%) | 21.8 | 20.7 | 22.5 | 21.1 |
| Difference in average transmittance of wavelength of 380 to 425 nm (%): Difference between incident angle of 0° and incident angle of 30° | 2.4 | | 0.2 | |
| Difference in average transmittance of wavelength of 615 to 725 nm (%): Difference between incident angle of 0° and incident angle of 30° | 1.1 | | 1.4 | |
| Wavelength at which transmittance becomes 20% (nm) | 664 | | 665 | |

Example 1, Example 2, and Example 4 to Example 8 correspond to Inventive Examples, and Example 3 and Example 9 correspond to Comparative Examples. In addition, in any of the optical fibers of Example 1 to Example 9, visually recognized warpage did not occur.

From the above-described results, in any of the optical filters as Inventive Examples, regardless of the resin base material of as thin as 90 μm or less, and the film thickness ratio of the inorganic dielectric layer to the resin base material being as high as greater than 8%, warpage did not occur, and thus it was implied a possibility that adhesion of the inorganic dielectric layer is high.

In addition, regardless of the total thickness of the optical filter was approximately 100 μm, the inclination in the four-point bending test was greater than 3.5 GPa in any surface, and very high rigidity was accomplished.

In addition, at least with regard to the optical filters in Example 1 and Example 6, it was confirmed that the optical filters had excellent optical characteristics such as high transmittance for visible light and high shielding properties for near-infrared light.

The present invention has been described in detail with reference to specific embodiments, but it should be understood by those skilled in the art that various medications or variations can be made within a range not departing from the gist of the invention. This application is based on Japanese patent application (Japanese Patent Application No. 2019-223748) filed on Dec. 11, 2019, the content of which is incorporated hereinto by reference.

INDUSTRIAL APPLICABILITY

In a near-infrared cut filter using a resin material as a base material, the optical filter of the present invention has high transmitting properties for visible light and high shielding properties for near-infrared light, and can realize high rigidity even in a small thickness. Accordingly, the optical filter is useful for applications in, for example, imaging devices such as a camera mounted in a smartphone for which high performance and a reduction in thickness are in progress in recent years.

REFERENCE SIGNS LIST

1: Optical filter
10: Resin base material
11: Transparent base material
12: Infrared-absorbing pigment layer
13: Hard coat layer
14: Light-shielding layer
20: Inorganic dielectric layer

What is claimed is:

1. An optical filter comprising:
a resin base material comprises an infrared-absorbing pigment layer; and
a pair of inorganic dielectric layers which are respectively disposed on or above both main surfaces of the resin base material as outermost layers,
wherein at least one of the pair of inorganic dielectric layers satisfies at least one of:
a condition in which a film thickness is 4 μm or greater, and
a condition in which the number of layers is 30 or greater, and
wherein a ratio of a total film thickness of the pair of inorganic dielectric layers to a film thickness of the resin base material is greater than 8%.

2. The optical filter according to claim 1, wherein in a stress-strain curve calculated by a four-point bending test, an inclination before a fracture mode occurs is greater than 3.5 GPa.

3. The optical filter according to claim 1,
wherein at least one of the pair of inorganic dielectric layers comprises two or more kinds of dielectric films, and
the dielectric film comprises at least one compound selected from the group consisting of $SiO_2$, $Al_2O_3$, $ZrO_2$, $TiO_2$, $Ta_2O_5$, and $Nb_2O_5$.

4. The optical filter according to claim 1,
wherein at least one of the pair of inorganic dielectric layers comprises a dielectric film comprising $SiO_2$ and a dielectric film comprising $TiO_2$, and
a ratio of a total film thickness of the dielectric film comprising $TiO_2$ to the total film thickness of the pair of inorganic dielectric layers is 20% or greater.

5. The optical filter according to claim 1, wherein the resin base material comprises at least one resin selected from the group consisting of a cycloolefin polymer, a cycloolefin copolymer, a polyimide, a polycarbonate, and a polyester.

6. The optical filter according to claim 1, wherein the resin base material comprises a hard coat layer as an outermost layer of at least one main surface.

7. The optical filter according to claim 1, wherein at least one of the pair of inorganic dielectric layers is an infrared reflective film.

8. The optical filter according to claim 1, further comprising a light-shielding layer between the resin base material and the inorganic dielectric layer in at least one main surface-side of the resin base material.

9. The optical filter according to claim 1, satisfying all of the following requirements (I-1) to (I-5):

(I-1) at an incident angle of 0°, an average transmittance $T_{435-480ave0}$ of light in a wavelength region of 435 nm to 480 nm is 86% or greater and an average transmittance $T_{500-600ave0}$ of light in a wavelength region of 500 nm to 600 is 89% or greater;

(I-2) at an incident angle of 30°, an average transmittance $T_{435-480ave30}$ of light in the wavelength region of 435 nm to 480 nm is 85% or greater, and an average transmittance $T_{500-600ave30}$ of light in the wavelength region of 500 nm to 600 nm is 89% or greater;

(I-3) an absolute value $\Delta T_{380-425ave0-30}$ of a difference between an average transmittance in a wavelength region of 380 nm to 425 nm at an incident angle of 0° and an average transmittance in the wavelength region of 380 nm to 425 nm at an incident angle of 30° is 3% or less;

(I-4) an absolute value $\Delta T_{615-725ave0-30}$ of a difference between an average transmittance in a wavelength region of 615 nm to 725 nm at an incident angle of 0° and an average transmittance in the wavelength region of 615 nm to 725 nm at the incident angle of 30° is 3% or less; and (I-5) in a transmittance of light at an incident angle of 0°, a wavelength at which a transmittance becomes 20% exists in a wavelength region of 650 nm to 685 nm.

10. An imaging device, comprising the optical filter described in claim 1.

* * * * *